United States Patent [19]
Suzuki et al.

[11] Patent Number: 5,845,109
[45] Date of Patent: Dec. 1, 1998

[54] OPERATION UNIT AND METHOD FOR CONTROLLING PROCESSING SPEED OF THE SAME

[75] Inventors: Seigo Suzuki; Shinichi Yoshioka, both of Tokyo, Japan

[73] Assignee: Kabushiki Kaisha Toshiba, Kawasaki, Japan

[21] Appl. No.: 898,123

[22] Filed: Jul. 22, 1997

[30] Foreign Application Priority Data

Jul. 22, 1996 [JP] Japan .................................. 8-192427

[51] Int. Cl.⁶ .................................................. G06F 13/00
[52] U.S. Cl. .......................................................... 395/552
[58] Field of Search ................................... 395/551, 552, 395/183.08, 185.12, 651

[56] References Cited

U.S. PATENT DOCUMENTS

| | | | |
|---|---|---|---|
| 5,475,690 | 12/1995 | Burns et al. | 395/552 X |
| 5,642,487 | 6/1997 | Flynn et al. | 395/552 X |
| 5,655,113 | 8/1997 | Leung et al. | 395/552 |
| 5,692,165 | 11/1997 | Seddeloh et al. | 395/552 X |
| 5,737,589 | 4/1998 | Doi et al. | 395/552 X |

OTHER PUBLICATIONS

Paver, "The Design and Implementation of an Asynchronous Microprocessor", A Thesis Submitted to the University of Manchester for the Degree of Doctor of Philosophy (1994).

*Primary Examiner*—Thomas M. Heckler
*Attorney, Agent, or Firm*—Foley & Lardner

[57] ABSTRACT

An operation unit includes at least one processing circuit, a completion detection circuit, and a synchronous clock generator. The detection circuit is connected to the processing circuits, and detect the completion of the operations carried out by the processing circuit. The synchronous clock generator generates a clock signal of the operation unit according to the speed of the processing circuit. If the unit includes plural processing circuits, detection circuits are connected to the processing circuits respectively. And a synthesis unit is connected to the detection circuits for receiving completion signals and prepares a general monitor flag to determine the slowest speed in the plural processing circuits. The clock signal is generated according to the slowest speed. Even if the operation speeds of LSIs scatters due to manufacturing variations, clock frequencies proper for a given LSI are dynamically and flexibly set so that every LSI may demonstrate its maximum performance.

14 Claims, 13 Drawing Sheets

FIG.7

|  | STATUS | INPUT | | | | OUTPUT | | |
|---|---|---|---|---|---|---|---|---|
|  |  | d- | d0 | d+ | MODE | UP | DN | INTRQ |
| DTO mode | TOO SHORT | L | L | L | L | H | L | L |
| | SHORT | L | L | H | L | H | L | L |
| | OK | L | H | H | L | L | L | L |
| | LONG | H | H | H | L | L | H | L |
| SMS mode | TOO SHORT | L | L | L | H | L | L | H |
| | SHORT | L | L | H | H | H | L | L |
| | OK | L | H | H | H | L | L | L |
| | LONG | H | H | H | H | L | L | L |

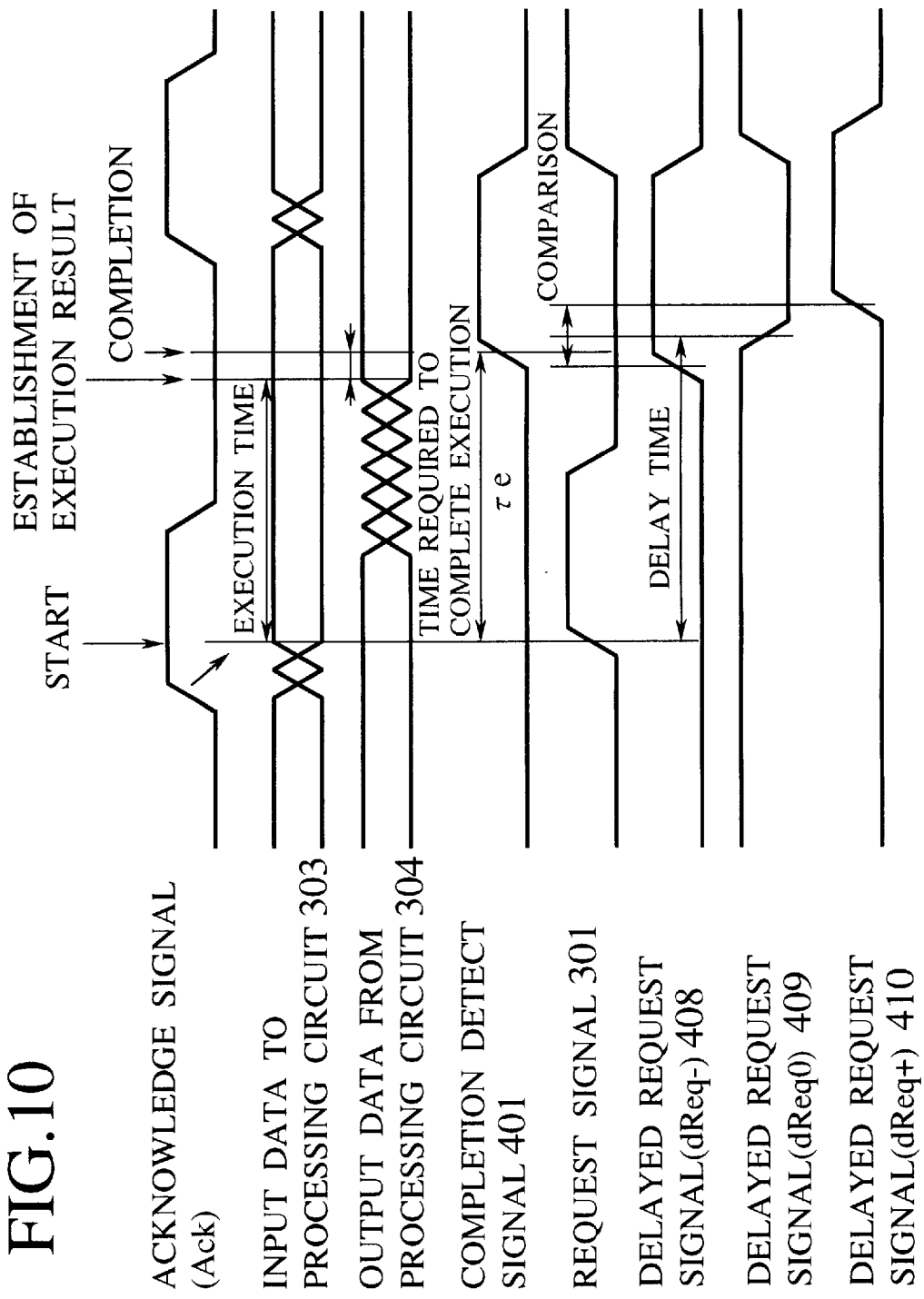

OPERATION UNIT AND METHOD FOR CONTROLLING PROCESSING SPEED OF THE SAME

BACKGROUND OF THE INVENTION

1. Field of the Invention

The present invention relates to an operation unit and a method for controlling the processing speed of the same. In particular, the present invention relates to an operation unit that provides high performance and stable operation without leaving unnecessary safety margins even if processing circuits contained in the operation unit involve different delay times due to manufacturing variations.

2. Description of the Prior Art

FIGS. 1 and 2 show a four-phase self-synchronous circuit according to a prior art. This circuit has a first status memory 33, a processing circuit 34, and a second status memory 35. The first status memory 33 is in front of the processing circuit 34, and the second status memory 35 is after the processing circuit 34. The first status memory 33 has effective data to be transferred to the processing circuit 34. The processing circuit 34 consists of combinational circuits, etc. When being ready to receive the next data, the second status memory 35 provides the first status memory 33 with an acknowledge signal Ack.n+1 of high level. Upon receiving the acknowledge signal, the first status memory 33 provides the processing circuit 34 with new data. The processing circuit 34 carries out an operation on the data, and after a certain time, provides the second status memory 35 with a result of the operation. Before storing the result, the second status memory 35 must be informed of the completion of the operation. Informing the second status memory 35 of the completion of an operation is made through one of the following techniques:

(1) Providing the processing circuit 34 with a logic of informing the completion of an operation.

(2) Doubling the combinational circuits of the processing circuit 34 so that one may prepare a completion signal based on the result of an operation carried out by the other.

(3) Arranging a delay circuit 36 (FIG. 1) for generating a delayed signal whose delay time covers a time necessary for processing data in the processing circuit 34 as well as a time necessary for storing processed data in the second status memory 35.

The technique (1) uses a dual-rail logic to detect the completion of an operation. Namely, the technique (1) needs a complementary logic signal in addition to a usual signal, to double hardware. The technique (2) also doubles hardware. The technique (3) is called a matched delay technique that additionally requires only a simple delay circuit such as an inverter chain to provide a delay time corresponding to the processing time of the processing circuit 34. Namely, the technique (3) involves only a small increase in hardware and cost.

The matched delay technique will be explained in more detail. In FIG. 1, the first status memory 33 provides data to be processed as well as a request signal Req.n+1. The request signal is delayed by the delay circuit 36. The lower limit of the delay time added by the delay circuit 36 to the request signal must be equal to the processing time of the processing circuit 34. Upon receiving a delayed request signal dReq.n+1 from the delay circuit 36 and after storing an operation result provided by the processing circuit 34, the second status memory 35 returns the acknowledge signal Ack.n+1 to the first status memory 33. In this way, the conventional self-synchronous circuit employs the delay circuit 36 to provide a delay time corresponding to a processing time, thereby suppressing a hardware increase.

Large operation units and LSIs that operate at a high speed involve intricate designing and many calculations. They also involve manufacturing variations. The manufacturing variations cause a serious problem in the total delay time of internal logic circuits. An LSI having intricate functions has myriads of paths each involving many logic gates. The number of these paths or the combinations of these paths is enormously large. For example, an LSI having 100,000 gates involves several tens or hundreds of thousands of logic paths. A delay time in every path must correctly be estimated. Even latest high-speed computers and work-stations take several minutes to correctly calculate a delay time in a single path involving several tens of gates. This means that several hundreds of minutes, or about 8,000 hours are necessary to test 100,000 paths. Namely, it takes about a year to check such number of paths even by running the computers day and night. In practice, results of the calculations must be examined along the way. Accordingly, it will take two to three years to test the paths of an LSI to design. This is an impractically long period because a usual LSI development period is one to one and half years. The degree of on-chip integration of LSIs is increasing continuously, and a development period of LSIs is becoming shorter and shorter.

An operation unit is designed through computer simulations. Results of the simulations frequently deviate from actual products. Recent LSIs employ small feature sizes of 0.2- and 0.1-$\mu$m. These feature sizes are nearly physical limits and are unable to secure sufficient processing accuracy. For example, a 10-$\mu$m feature size secures a relative accuracy of 5% with an absolute accuracy of 0.5 $\mu$m. A 0.1-$\mu$m feature size element must have an absolute accuracy of 5 nm to secure a relative accuracy of 5%. The state of the art can not nearly achieve the absolute accuracy. Accordingly, the 0.1-$\mu$m feature size element may be formed on a processing accuracy of 50 nm. Then, the element has a dimensional accuracy of 50%, which is very rough. The electric characteristics of a MOS element or a CMOS element are dependent on the physical dimensions or geometry sizes thereof. Namely, a dimensional accuracy of 50% is equal to an electrical accuracy of 50%. The electrical accuracy of 50% makes the delay time mentioned above involve an error of 50%. For example, a designed center value of 5.50 ns in delay time may vary in the range of 2.75 ns to 8.25 ns in an actual product. This variation makes the computer simulations useless.

LSI elements frequently involve a manufacturing error of ±15 to 20% in their characteristics. With this error it is very difficult to correctly balance the performance of each element in a given LSI and provide the LSI with high performance. Recent CAD technology is effective to arrange complicated patterns in an LSI chip. However, the CAD is unable to guarantee the performance of LSIs or provide LSIs with high performance. For example, it is difficult for the CAD to design an LSI having a total performance error of ±10% with CMOSs each having a characteristic error of ±50%.

The delay circuit 36 of FIG. 1 may be an inverter chain that provides a delay time corresponding to the processing time of the processing circuit 34. This delay time may scatter due to manufacturing variations. Accordingly, the delay time must include a safety margin, to guarantee a stable operation of the operation unit as a whole. The stable operation is not secured if the delay time is made shorter than an allowable limit by temperature changes or power supply fluctuations. This is the reason why the delay circuit must have a sufficient delay margin. This delay margin, however, deteriorates the performance of the operation unit.

It is known that an asynchronous circuit is effective to improve an operation speed. Many asynchronously controlled computers were developed at the beginning of computer designing when elements showed insufficient performance. The initial asynchronous computers did not employ global clock signals. These computers had to correctly reproduce a sequence of operations, and therefore, had to carry out strict control according to internal procedures. The initial asynchronous technique, therefore, involved intricate control operations and troublesome debugging work. The operation speeds of parts of the conventional asynchronous unit were used to deviated from one another. There was a risk of synchronization error, therefore, in synchronizing some parts with a fixed clock signal. Synchronizing every part was achievable only with a large delay safety margin that slowed down an operation speed.

SUMMARY OF THE INVENTION

An object of the present invention is to provide an operation unit that provides high performance and stable operation even with electric characteristic fluctuations due to manufacturing variations and a method for controlling the processing speed thereof. More specifically, the object of the present invention is to provide an operation unit that provides high performance and stable operation even with delay time fluctuations due to manufacturing variations and a method for controlling the processing speed thereof.

Another object of the present invention is to provide an operation unit that provides high performance and stable operation without allowing a large safety margin even with operational fluctuations in parts thereof due to manufacturing variations among lots, batches, and chips, and a method for controlling the processing speed thereof.

Still another object of the present invention is to provide a method for setting a proper clock frequency for each block of a given chip so that the chip may demonstrate its maximum performance, and an operation unit that employs the method. Also provided is an operation unit that employs an easily controllable clock frequency and is easy to design and debug, and a method for controlling the processing speed thereof.

Still another object of the present invention is to provide an operation unit that is stable, operates at a high speed, and provides high performance even with circuits imbalanced by external factors such as temperature changes and power source fluctuations, and a method for controlling the processing speed thereof.

Still another object of the present invention is to provide an operation unit that stably operates at a high speed without overheads for optimizing a delay time for a processing speed and overheads for monitoring the processing speed.

Recent LSIs allow users to correctly grasp and control the relative speeds of parts contained in the LSIs. Accordingly, it is technically possible to employ a standardized clock frequency in a given LSI. It is difficult, however, to regulate the absolute speeds and delays of internal circuits of an LSI with respect to characteristic variations and temperature changes. Setting a clock frequency for a given LSI is a great problem. It is relatively easy to design the speed of each block in an LSI at $A \times 10^{-9}$ seconds (A·ns) ±5%. It is very difficult, however, to control the value of A·ns into a narrow range. Uniformly setting the value of A·ns needs a large safety margin. The inventor of the present invention has made careful studies to solve the problems and has found a way to dynamically and flexibly set a clock frequency for each block of an actual semiconductor chip product, instead of uniformly setting an absolute speed for internal circuits of the product.

In order to accomplish the objects, a first aspect of the present invention provides an operation unit having at least one processing circuit for carrying out a given operation, a completion detection circuit for detecting the completion of the operation of the processing circuit, and a synchronous clock generator for generating a clock signal synchronized with the output of the completion detection circuit. The generated clock signal is used to carry out an operation. More specifically, the operation unit according to the first aspect may have at least two processing circuits, at least two completion detection circuits, a synthesis unit, and a synchronous clock generator. The processing circuits carry out given operations. The completion detection circuits are connected to the processing circuits, respectively, and detect the completion of the operations of the processing circuits. The synthesis unit receives the outputs of the completion detection circuits and detects the completion of the operations of the processing circuits. The synchronous clock generator generates a clock signal synchronized with the output of the synthesis unit. The synchronous clock generator may be a phase locked circuit of a phase locked loop (PLL) type. The synthesis unit may be an AND circuit.

The first aspect of the present invention can divide an LSI into operation blocks. Each of the operation blocks is provided with a kind of flag such as a logic or a latch to monitor the start and end of an operation of the operation block. A delay time between the start and the end of the operation of the operation block is fed back to form an oscillator providing a specific oscillation frequency. A clock signal synchronized with the oscillation frequency is used to control internal operations of the LSI. Even if LSIs involve manufacturing variations, the first aspect of the present invention sets optimum internal clock periods for the LSIs manufactured so that they demonstrate their maximum performance. The first aspect eliminates slow clock frequencies that involve extra large safety margins. The first aspect dynamically sets a clock period for each operation block according to actual operations of the block. The first aspect is capable of automatically and flexibly setting optimum clock frequencies for LSIs even if the manufactured LSI chips involve scattering in speed performances, or are affected by environment such as temperature changes, and supply voltage fluctuations.

A second aspect of the present invention provides an operation unit having a sequence of processing circuits, called segments or stages, through which a stream of data can be passed. Namely, the operation unit includes a first status memory, a processing circuit, and a second status memory. The first status memory holds data. The processing circuit receives the data from the first status memory and carries out a given operation on the data. The second status memory stores a result of the operation carried out by the processing circuit. The first and second status memories consist of registers such as flip flops or latches. The operation unit further has an evaluation data memory and a delay circuit block. The evaluation data memory supplies evaluation data to the processing circuit through the first status memory. The evaluation data is used to measure a delay time between the input and output of the data to and from the processing circuit. The delay circuit block receives a result of the operation carried out on the evaluation data from the processing circuit, the evaluation data from the evaluation data memory, and a request signal Req from the first status memory. Then, the delay circuit block adds a delay time to the request signal Req and provides the second status memory with a delayed request signal dReq. The delay circuit block has a delay circuit, a completion detector, a delay comparator, and a delay time controller. The delay circuit adds the delay time to the request signal Req and provides the second status memory with the delayed request signal dReq. The completion detector detects the completion of the operation carried out on the evaluation data by the processing circuit. The delay comparator determines the temporal sequence of a completion detect signal provided by the completion detector and the delayed request signal dReq and provides delay adjusting signals. The delay time controller changes the delay time of the delay circuit in response to the delay adjusting signals. The delay time controller has a counter block that is incremented or decremented in response to the delay adjusting signals, first and second delay time memories for storing the values of the counter block, and a control current generator for generating a control current according to values stored in the first and second delay time memories. The control current is used to change the delay time of the delay circuit.

The delay time controller of the second aspect may carry out a negative feedback control operation on the delay time of the delay circuit according to the delay adjusting signals. The evaluation data memory may provide the evaluation data during an initialization to be carried out when a power supply is turned on. If the operation unit has a cache memory, the evaluation data memory may provide the evaluation data when the cache memory causes a mishit. The delay time controller may determine whether or not the delay time of the delay circuit must be elongated according to the output of the delay comparator. The evaluation data may be provided when an instruction that does not use the processing circuit is executed, to reduce overheads.

The control current generator of the second aspect may consist of a current mirror circuit, which consists of a plurality of transistors. The geometry sizes of these transistors have a ratio of, for example, 1:2:4:8 to control a wide range of current values.

The delay comparator of the second aspect determines a temporal sequence of the completion detect signal and delay request signal dReq. If the delay time added to the request signal Req is shorter than the processing time of the processing circuit and if the shortage exceeds a tolerance, the delay comparator initializes the delay time.

According to the second aspect, the evaluation data memory provides the processing circuit with the evaluation data through the first status memory. The processing circuit carries out an operation on the evaluation data. If a result of the operation agrees with an expected value, the completion detector provides a completion detect signal. As shown in FIG. 8, the delay comparator compares the completion detect signal with delayed signals (dReq.−, dReq.0, dReq.+) provided by the delay circuit and finds out the difference between them. If the completion detect signal is ahead of the delayed request signal, the delay time applied by the delay circuit to the request signal is shortened, and if the completion detect signal is behind the delayed request signal, the delay time is elongated.

If the operation unit is operating, the evaluation data is supplied to the processing circuit when an instruction that does not use the processing circuit is executed. The processing circuit carries out an operation on the evaluation data. If a result of the operation agrees with an expected value, the completion detector provides a completion detect signal. The delay comparator compares the completion detect signal with the delayed request signal provided by the delay circuit and finds out the difference between them. Only when the completion detect signal is behind the delayed request signal, the delay time added by the delay circuit to the request signal is elongated. If the completion detect signal is far behind the delayed request signal, the delay time of the delay circuit is initialized, and an exception request signal (INTRQ) is provided. In this way, the second aspect monitors the delay time of the delay circuit, to secure a minimum delay time necessary for a stable operation.

A third aspect of the present invention provides a method of controlling the processing speed of an operation unit. The operation unit has at least one processing circuit that carry out given operations. The method detects the completion of the operation of the processing circuit, determines the processing time of the processing circuit according to completion detect signals, generates a clock signal synchronized with the determined processing time. If the operation unit includes plural processing circuits, the largest processing time among the plural processing circuits is determined. And the clock signal is synchronized with the largest processing time. The processing speed of the operation unit is controlled by the generated clock signal.

The method divides a given LSI into operation blocks and prepares a kind of flag such as a logic or a latch for monitoring the start and end of an operation in each block. A delay between the start and end of the operation in each block is used or fed back to form an oscillator providing a specific oscillation frequency. A clock signal synchronized with the oscillation frequency is used to control internal operations of the LSI chip. Even if LSI chips involve manufacturing variations, the third aspect of the present invention sets optimum internal clock periods for respective LSI chip so that they demonstrate their maximum performance. The third aspect eliminates slow clock frequencies that involve excessively large delay margins. The third aspect dynamically sets a clock period for each operation block according an actual operation of the block. The third aspect is capable of automatically and flexibly setting optimum clock frequencies for LSIs even if the manufactured LSI chips scatter in speed performances. Further the third aspect suppresses the effects of temperature changes, and supply voltage fluctuations.

A fourth aspect of the present invention provides a method for controlling the processing speed of an operation unit. The operation unit may have a pipeline structure including a first status memory for storing data, a processing circuit for receiving the data and carries out a given operation on the data, and a second status memory for storing a result of the operation. The pipeline structure has a sequence of processing circuits through which a stream of the data can be passed. The method provides the first status memory with evaluation data that is used to measure a delay time between the input and output of the data to and from the processing circuit. The method supplies the evaluation data to the processing circuit, which processes it. The time for processing the evaluation data in the processing circuit determines a delay time added to a request signal Req that is provided by the first status memory. The delayed request signal dReq is supplied to the second status memory. The method detects the completion of the operation carried out on the evaluation data by the processing circuit according to a result of the operation. According to a completion detect signal and the delayed request signal, the method determines a temporal sequence of the completion detect signal and delayed request signal. According to the determination, the method changes the delay time of the delay circuit.

The fourth aspect may provide the first status memory with the evaluation data during an initialization to be carried out when a power supply is turned on. If the operation unit has a cache memory, the evaluation data is provided when the cache memory causes a mishit. This reduces overheads and shortens a processing time. The fourth aspect may store the evaluation data in the first status memory when an instruction that does not use the processing circuit is executed and monitors the length of the delay time. This reduces overheads. Determining or optimizing the length of the delay time or monitoring the delay time may be carried out with the use of a delay circuit block.

The fourth aspect supplies the evaluation data from an evaluation data memory to the processing circuit through the first status memory. The processing circuit carries out an operation on the evaluation data. If a result of the operation agrees with an expected value, a completion detector contained in the delay circuit block detects the agreement and provides a completion detect signal. The delay circuit block further has a delay comparator and a delay circuit. The delay comparator compares the completion detect signal with the delayed request signal dReq provided by the delay circuit and finds out the difference between them. If the completion detect signal is ahead of the delayed request signal, the delay time applied by the delay circuit to the request signal is shortened, and if the completion detect signal is behind the delayed request signal, the delay time of the delay circuit is elongated. If the operation unit is operating, the evaluation data is supplied to the processing circuit when an instruction that does not use the processing circuit is executed. The processing circuit carries out an operation on the evaluation data. If a result of the operation agrees with an expected value, the completion detector provides a completion detect signal. The delay comparator compares the completion detect signal with the delayed request signal and finds out the difference between them. Only when the completion detect signal is behind the delayed request signal, the delay time given by the delay circuit to the request signal is elongated. If the completion detect signal is far behind the delayed request signal, the delay time of the delay circuit is initialized, and an exception request signal (INTRQ) is provided. In this way, the fourth aspect dynamically determines a cycle time without an extra delay margin. The fourth aspect monitors a delay time that is the base of the cycle time, to secure a minimum delay time necessary for a stable operation as well as maintaining a processing speed.

The operation unit of the fourth aspect is asynchronous as a whole. The operation unit carries out negative feedback control to optimize a delay time when an actual operation is not carried out. The fourth aspect is capable of controlling the processing speed of the operation unit so that a cycle time is not shortened during a normal operation, thereby stabilizing the operation thereof. The delay circuit that provides the delay time to determine the operation speed of the processing circuit may be an inverter chain. In this case, the fourth aspect monitors the delay time of the delay circuit, to secure a minimum delay time for a stable operation even if the operation unit involves manufacturing variations that may fluctuate the delay time. The fourth aspect carries out the optimizing and monitoring operations of the delay time that determines the processing speed of the operation unit during a period in which the processing circuit has no task to carry out. This reduces overheads.

As explained above, the first to fourth aspects of the present invention provide an operation unit that demonstrates high performance and stable operation even with large manufacturing variation and wide characteristic dispersions. Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

BRIEF DESCRIPTION OF THE DRAWINGS

FIG. 7 shows a truth table used by the time difference decision circuit shown in FIG. 6D;

FIG. 10 is a timing chart showing the operation of an operation unit according to the second embodiment.

DETAILED DESCRIPTION OF THE EMBODIMENTS

Figure 1:
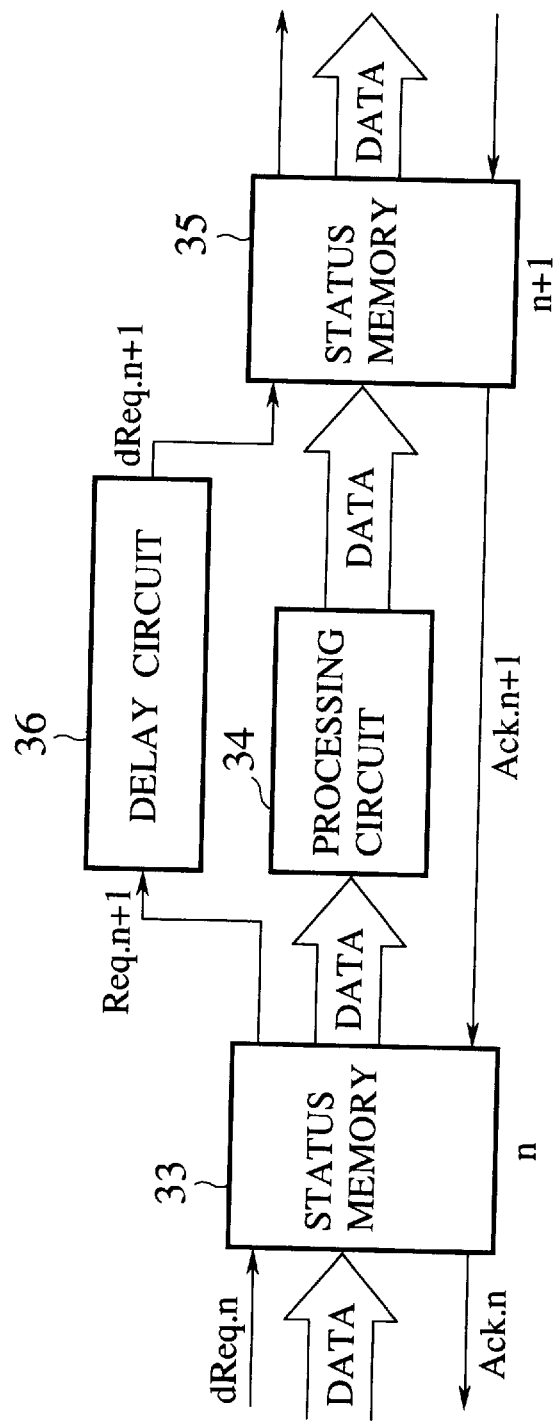
FIG. 1 is a block diagram showing part of a self-synchronizing circuit according to a prior art.
Figure 2:
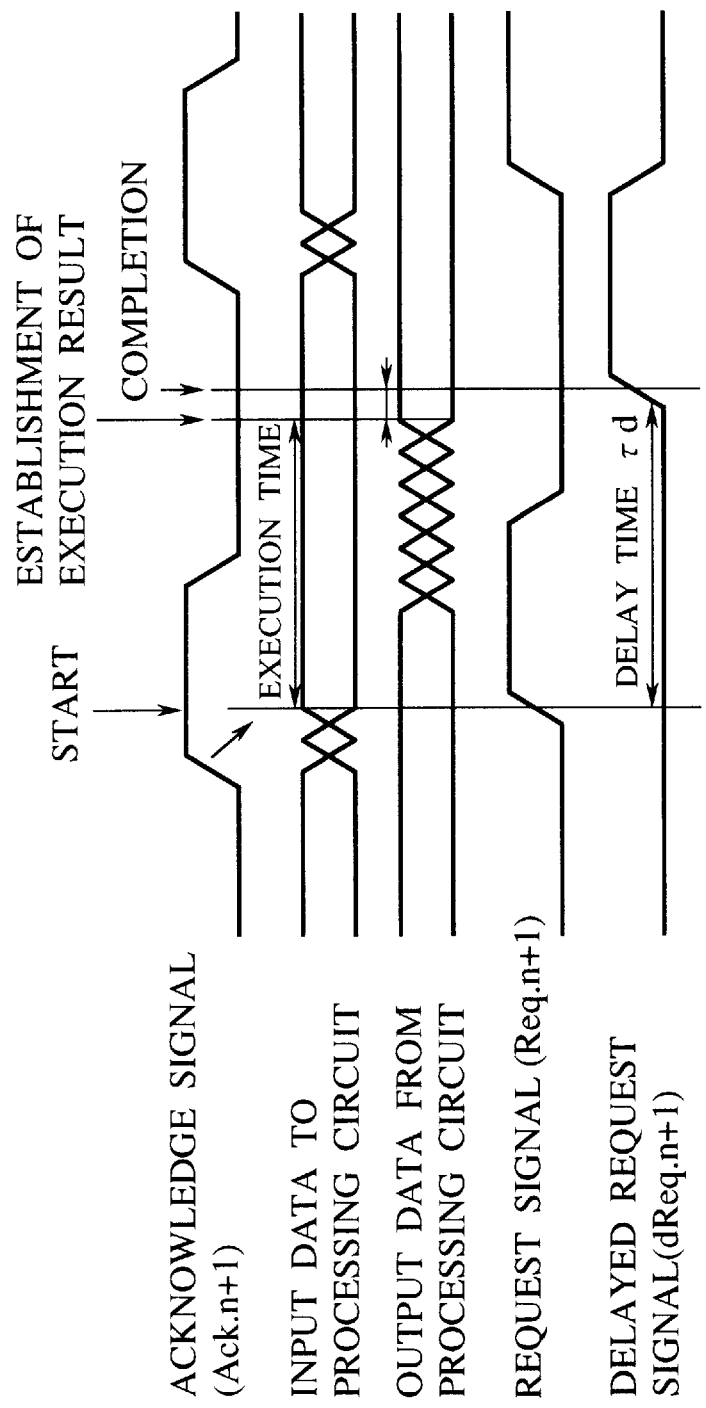
FIG. 2 is a timing chart showing the operation of the prior art.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

(First Embodiment)

Figure 3:
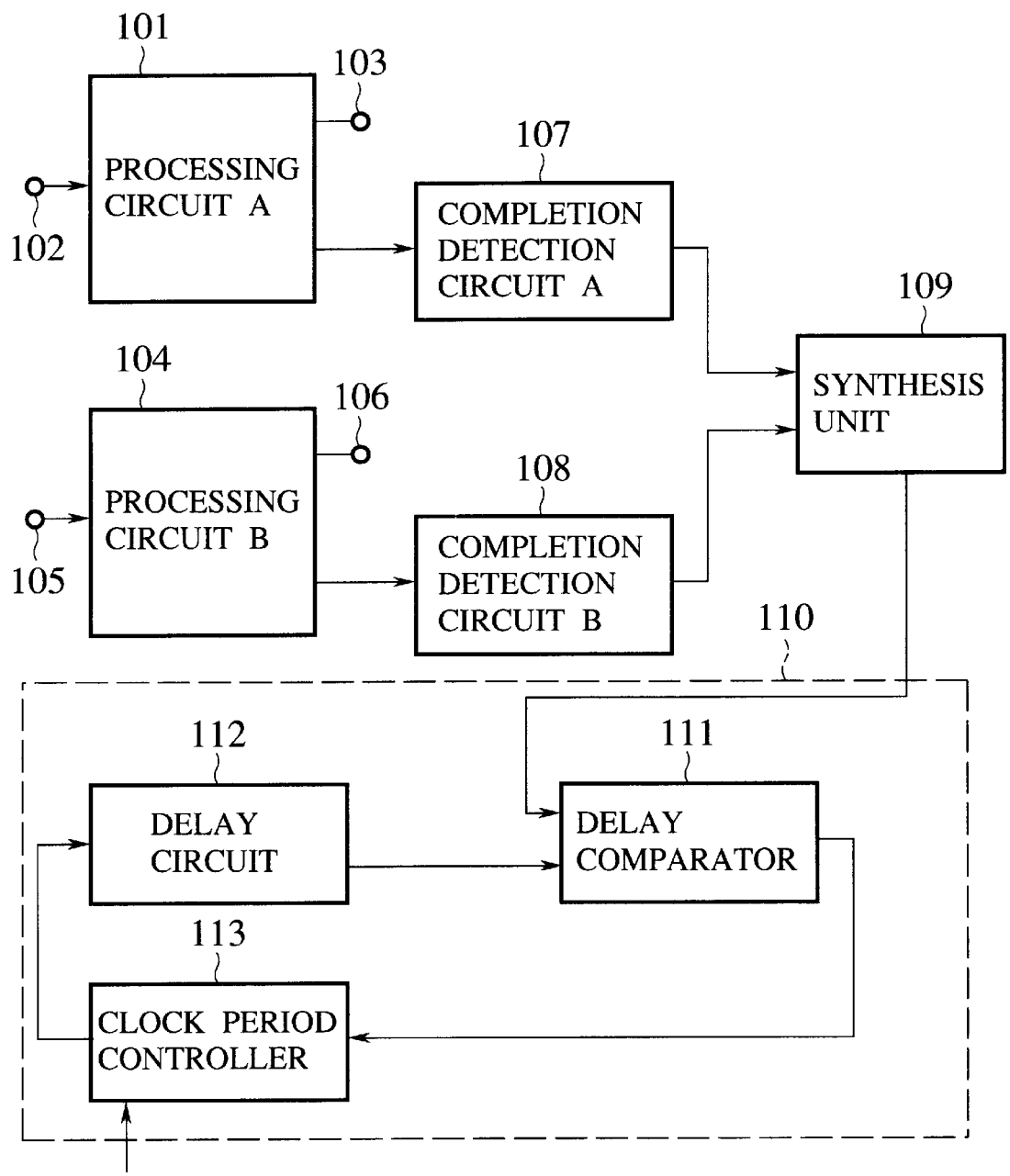
FIG. 3 is a block diagram showing an operation unit according to a first embodiment of the present invention.

FIG. 3 shows an operation unit according to the first embodiment of the present invention. The operation unit has two processing circuits A and B (101, 104), completion detection circuits A and B (107, 108), a synthesis unit 109, and a synchronous clock generator 110. The processing circuits 101 and 104 carry out given operations. The completion detection circuits 107 and 108 are connected to the processing circuits 101 and 104, respectively, to detect the completion of the operations of the processing circuits 101 and 104. The synthesis unit 109 receives the outputs of the completion detection circuits 107 and 108 and detects the completion of both the processing circuits. The synchronous clock generator 110 generates a clock signal synchronized with the output of the synthesis unit 109. The generated clock signal is used to carry out operations of the operation unit of the present invention.

The following explanation is made with the processing circuit 101 being an adder in an arithmetic logic unit (ALU) and the processing unit 104 being an exclusively designed divider. When designing the operation unit, detailed timing simulations are carried out preliminary in advance. In this explanation, it is supposed that the timing simulations have told that, for example, the adder 101 and divider 104 are involved in a critical path. Accordingly, only the adder 101 and divider 104 in the critical path are provided with monitor flags indicating that the completion of operations in the devices 101 and 104 must be monitored. Namely, it is not necessary to provide every processing circuit other than the circuits 101 and 104 with a monitor flag.

The completion detection circuits 107 and 108 are conventional ones, and therefore, are not explained in detail. For example, operation outputs are inversions of P and P'', which are set to each "1" at initial precharging. Then, one of the outputs provides "0" at the completion of an operation. When an EXCLUSIVE-OR of the outputs becomes "1," it is determined that the operation has been completed. Accordingly, the EXCLUSIVE-OR signal may be used as a completion detect signal. The completion detection circuits 107 and 108 are connected to the adder 101 and divider 104, respectively. The outputs of the completion detection circuits 107 and 108 are combined by the synthesis unit 109, which may be an AND circuit to provide a general monitor flag. The general monitor flag is used to detect a delay in the critical path. If only the processing circuit A is on a critical path, a monitor flag is provided selectively to the processing circuit A. In this case, the synthesis unit 109 may be omitted. And output of the completion detection circuit A is used to detect the delay in the critical path.

The general monitor flag is transferred to the synchronous clock generator 110, which generates a clock signal synchronized with the output of the synthesis unit 109. If only one processing circuit is on the critical path, or only one processing circuit is included in the processing circuit, the output of the completion detection circuit connected to the processing circuit is transferred to the synchronous clock generator 110. In FIG. 3, the synchronous clock generator consists of a delay comparator 111, a delay circuit 112, and a clock period controller 113. The clock period controller 113 may be a phase clock circuit of a phase locked loop PLL type. The output of the clock period controller 113 is supplied to the delay circuit 112. Alternatively, the delay comparator 111 compares the outputs of the delay circuit 112 and synthesis unit 109 with each other, and a result of the comparison is fed back to the clock period controller 113, so that the synchronous clock generator 110 as a whole serves as a phase clock circuit of a PLL type.

The synchronous clock generator 110 determines the clock frequency of the operation unit. Namely, the present invention is capable of setting an optimum clock frequency for each operation block of a given LSI to let the LSI demonstrate its maximum performance.

According to recent pipeline designing, a processing speed depends on the kind of an instruction or operation to execute and the kind of data to handle. It is impractical to set different cycle times for individual pipelines. Accordingly, it is usual to find out a one dimensional cycle time that is a least common multiple for every processing circuits (or segments) and use it as a reference to design a time scheme of pipelines. In other words, a pipeline structure is a synchronous structure based on a certain clock signal. This is opposite to an asynchronous structure that realizes a high-speed operation without a fixed clock signal. The first embodiment of the present invention is able to set a common clock signal that involves no extra delay margin, for a pipeline or a set of pipelines, thereby securing high performance.

Figure 4:
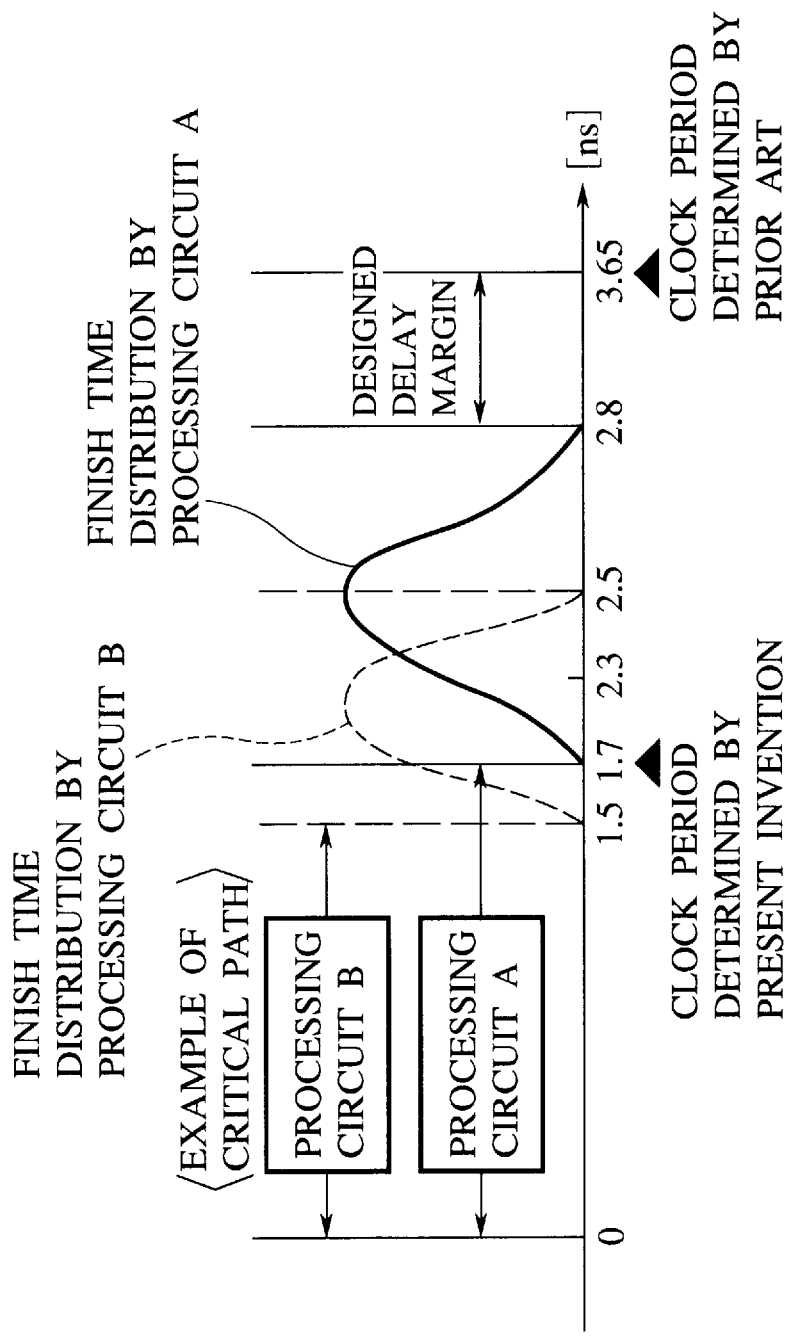
FIG. 4 explains a method of setting a clock period according to the first embodiment.

FIG. 4 shows the effectiveness of the first embodiment. The first embodiment sets a global clock period according to an actual delay in a critical path set in advance. Accordingly, the global clock period is an optimum value that takes manufacturing variations into account. The first embodiment eliminates useless design margins. In FIG. 3, the processing circuit A (adder in ALU) 101 and the processing circuit B (divider) 104 are in a critical path. A design center value of the delay of the processing circuit A (adder) 101 is, for example, 2.5 ns, and that of the processing circuit B (divider) 104 is 2.3 ns. In this case, actual delays fluctuate depending on manufacturing conditions. For example, the adder 101 may have a delay time in the range of 1.7 to 2.8 ns, and the divider 104 may have a delay time in the range of 1.5 to 2.5 ns. According to the prior art, the worst value, i.e., 2.8 ns of the adder 101 is taken, and a proper delay margin, for example, 30% is added to the worst value. As a result, a clock period (cycle time) of 3.65 ns will be determined by the prior art. This is equal to an operation frequency of 274 MHz.

On the other hand, the present invention employs the minimum delay time of 1.7 ns of the adder 101 for a fastest chip. In this case, the fastest chip will have a cycle time of 1.7 ns and an operation frequency of 588 MHz. Namely, the present invention improves the performance of products by 2.15 times (588/274=2.15) of the prior art.

The price of a processor that is twice faster than a standard processor is twice as high as the price of the standard processor. Manufacturing variations produce a mixture of high- and low-speed products. Even the product having a potential for a high-speed performance is sold at an average price set for the mixture of products because every product is designed to run on a moderate clock signal that involves a vast safety margin. In this case, the present invention is able to make the high-speed chips provide their maximum performance and enable the users to select them from the low-speed chips. Manufacturing variations may expand to three to five times among manufacturing lots, machines, and factories. Accordingly, the present invention is capable of picking up chips that operate three to five times faster than low-speed ones from a batch of products and provide them to the users.

The first embodiment sets a clock period that fits to a given manufactured chip so that the chip may provide its maximum performance and speed. For a particular chip, the first embodiment is able to artificially set a self-clock signal that is faster than the actual processing speed of the chip by selecting the position of a monitor flag. A given chip may have a worst delay of, for example, 13 ns in a critical path. The prior art adds a fixed safety margin to the worst delay, and provides a clock period of 14 to 15 ns. On the other hand, the first embodiment employs a clock period of 13 ns without safety margin. In addition, the first embodiment may put a monitor flag at a position out of the critical path, to set a clock period of 10 ns that is faster than the worst value of 13 ns, in a particular case. In this case, an improvement of 66% is achieved. If any process is unable to catch up the clock period due to a programming contents or a temperature change, the process is executed over the next clock period. If there is a second process that must wait for the completion of the first process, a completion flag of the first process is monitored, and the second process is started on a clock next to the clock where the completion flag of the first process is enabled.

In this way, the first embodiment determines clock frequencies according to the actual characteristics of a given LSI chip instead of uniformly determining a clock frequency from the outside. Namely, the first embodiment finds out the processing time of a slowest processing circuit in a given LSI chip, and determines a characteristic clock frequency for operation of the given LSI chip accordingly. The first embodiment sets a higher clock frequency for a higher speed LSI chip so that the LSI may demonstrate its maximum performance. To determine such an optimum clock frequency, the first embodiment never needs a large number of calculations that take 8000 hours or over to find out a slowest path among complicated paths. In addition, the first embodiment never includes extra safety margins in a clock signal when designing an LSI. The first embodiment determines an optimum clock signal that fits the actual operation speed of a given LSI chip manufactured. Namely, the first embodiment dynamically and flexibly sets a clock frequency for the given LSI chip manufactured. Without an intricate structure such as an asynchronous approach, the first embodiment materializes an operation unit whose performance is comparable to an asynchronous system only by adding small hardware to the operation unit.

(Second Embodiment)

Figure 5:
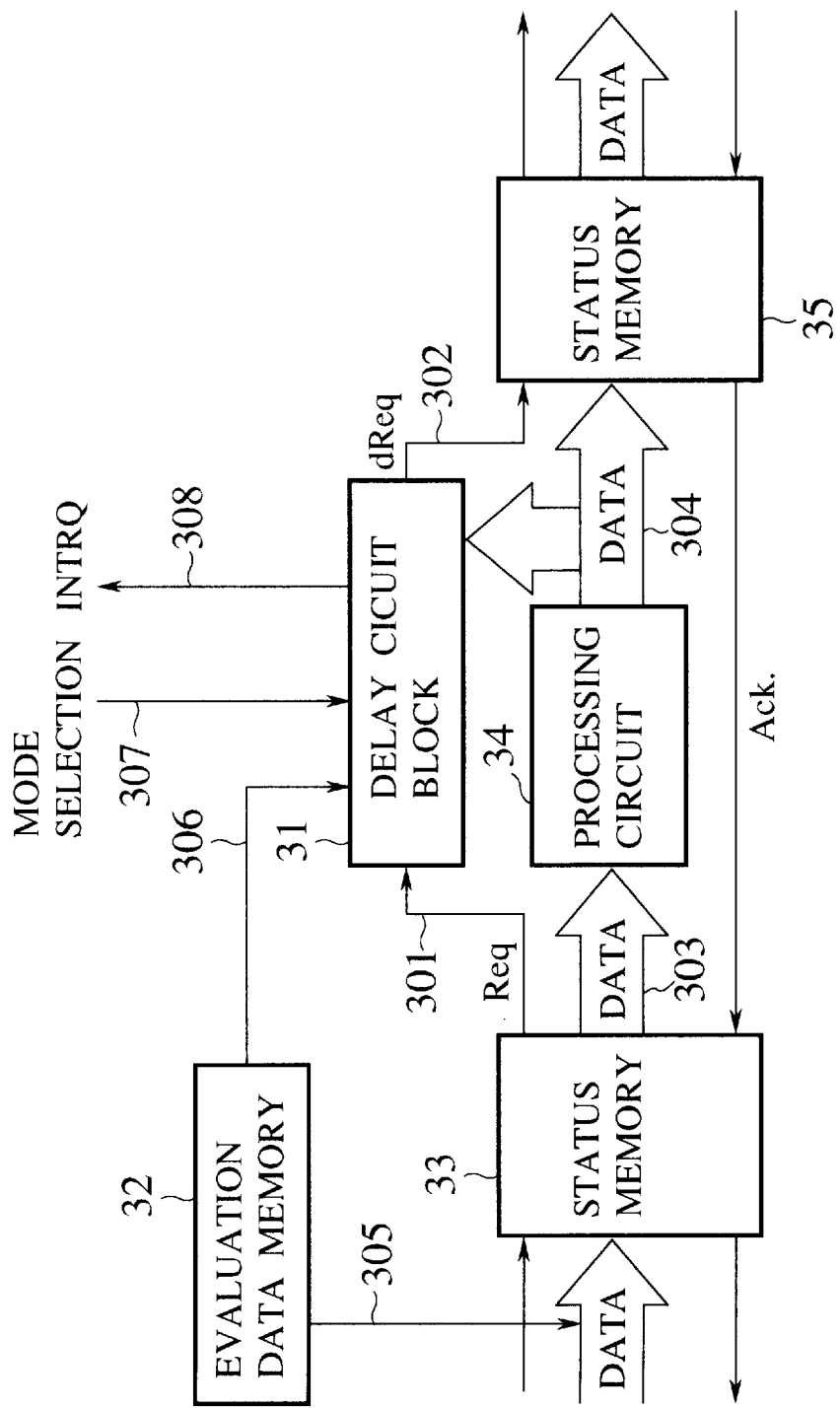
FIG. 5 is a block diagram showing an operation unit according to a second embodiment of the present invention.

An operation unit according to the second embodiment of the present invention and a method for controlling the processing speed thereof will be explained with reference to FIG. 5 to FIG. 10. As shown in FIG. 5, status memories 33, 35, and the like and processing circuits 34 are connected to one another to form a pipeline structure. A delay circuit block 31 is arranged between the status memories 33 and 35. The delay circuit block 31 controls a delay time added to a request signal (Req) 301. The operation unit according to the second embodiment includes a sequence of the first and second status memories 33 and 35 and the processing circuit 34. The first status memory 33 stores data 303. The processing circuit 34 receives the data 303 from the first status memory 33 and carries out a given operation on the data 303. The second status memory 35 stores a result 304 of the operation provided by the processing circuit 34. The operation unit further has an evaluation data memory 32 and the delay circuit block 31. The evaluation data memory 32 provides the processing circuit 34 with evaluation data through the first status memory 33. The delay circuit block 31 adds a delay time to the request signal (Req) 301 provided by the first status memory 33 according to the operation result 304 and provides the second status memory 35 with a delayed request signal (dReq) 302. The "evaluation data" is used to measure a delay time between the reception of the data 303 by the processing circuit 34 and the providing of the process result 304 from the processing circuit 34. The second embodiment optimizes the delay time when the system is started and monitors the delay time while the system is operating through the below-mentioned two modes under the control of the delay circuit block 31.

[a] Delay Time Optimizing (DTO) mode

When the system is started, the processing speed of the operation unit is measured. According to the measured speed, an optimum delay time is determined and added to the request signal Req. This mode will be explained with reference to FIG. 5.

The evaluation data memory 32 sends the evaluation data to the first status memory 33. The first status memory 33 provides the data 303 and request signal (Req) 301. The data 303 is processed by the processing circuit 34, which provides a process result 304 to the second status memory 35. The delay circuit block 31 adds a delay time to the request signal 301. The delayed request signal (dReq) 302 is used to inform the second status memory 35 that the process result 304 from the processing circuit 34 has been fixed. In response to the delayed request signal 302, the second status memory 35 stores the process result 304. Accordingly, the delay time added to the request signal 301 by the delay circuit block 31 must be equal to the processing time of the processing circuit 34. The processing time is an interval between the reception of the data 303 by the processing circuit 34 and the providing of the process result 304 from the processing circuit 34.

The delay time optimizing mode (hereinafter abbreviated as "DTO mode") intends to determine the delay time so that a normal operation is secured and performance is improved. To secure the normal operation, the delay time added to the request signal 301 must not be shorter than the processing time of the processing circuit 34. To improve the performance, the delay time must not be too long compared with the processing time. It is important, therefore, to compare the processing time of the processing circuit 34 with the delay time added to the request signal 301 and feed a result of the comparison back to the delay circuit block 31, to optimize the delay time. The timing of executing the DTO mode is not limited to the initialization of the system. If the system has a cache memory, for example, the DTO mode may be carried out while data is being transferred to the cache memory. Namely, the DTO mode may be carried out in an interval in which the processing circuit 34 is not used. It is possible to use a timer to put the processing circuit 34 in an unused state at regular intervals.

[b] System Monitoring and Stabilizing (SMS) mode

After the DTO mode determines a delay time to be given to the request signal (Req) 301, the processing time of the processing circuit 34 may deviate from the delay time due to external factors such as temperature changes and power supply fluctuations. If the delay time becomes shorter than the processing time, a normal operation will not be guaranteed and the system will be destabilized. To adjust the delay time and stabilize the system, the second embodiment increases the delay time if the delay time becomes shorter than the processing time.

The system monitoring and stabilizing mode (hereinafter abbreviated as "SMS mode") for monitoring the delay time is carried out while an instruction such as an NOP (non-operation) instruction that does not use the processing circuit 34 is being executed. This SMS mode is basically the same as the DTO mode. Namely, the evaluation data is transferred from the evaluation data memory 32 to the processing circuit 34 through the first status memory 33, and the delay circuit block 31 compares the delay time added to the request signal 301 with the processing time of the processing circuit 34, to thereby evaluate the delay time. What is different from the DTO mode is that the SMS mode carries out a negative feedback operation to increase the delay time only when the delay time added to the request signal 301 is shorter than the processing time of the processing circuit 34. If the delay time is longer than the processing time, no negative feedback is carried out. If the delay time is shorter than the processing time and if the difference between them is above a tolerance, an exception request signal INTRQ 308 is provided, and the delay time is initialized. As a result, the delayed request signal (dReq) 302 reaches to the second status memory 35 only after the completion of the processing of the processing circuit 34, and therefore, the second status memory 35 can surely hold the output of the processing circuit 34. This results in stabilizing the system. If the delay time provided by the delay circuit block 31 becomes excessively shorter than the processing time due to external factors such as temperature changes and power supply fluctuations, the system is initialized with the delay time of the delay circuit block 31 being reset to nearly a maximum value, thereby minimizing system errors.

Figure 6A:
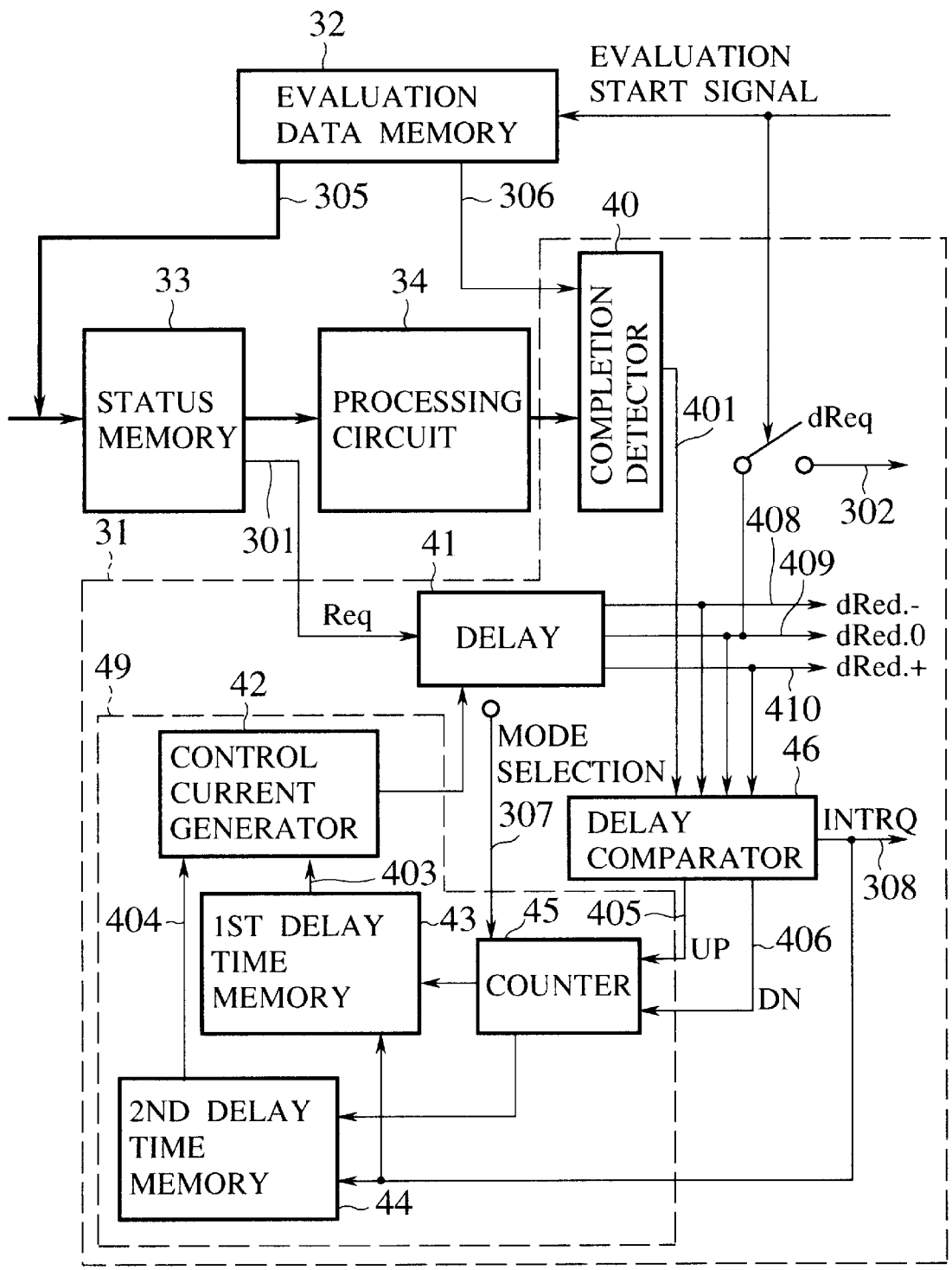
FIG. 6A is a block diagram showing a delay circuit block of FIG. 5 and the periphery thereof.

FIG. 6A shows the details of the delay circuit block 31 and the periphery thereof. The delay circuit block 31 has a delay circuit 41, a completion detector 40, a delay comparator 46, and a delay time controller 49. The delay time controller 49 has a counter block 45, a first delay time memory 43, a second delay time memory 44, and a control current generator 42. For the sake of explanation, FIG. 6A also shows the processing circuit 34, first status memory 33, and evaluation data memory 32.

The delay comparator 46 compares a completion detect signal 401 with three delayed request signals (dReq.−) 408, (dReq.0) 409, and (dReq.+) 410, to determine a temporal sequence of them. Then, the delay comparator 46 provides the counter block 45 with delay adjusting signals UP405 and DN406. In response to the rising edges of the delay adjusting signals, the counter block 45 carries out count-up and count-down operations. A mode selection signal 307 determines a way of updating the contents of the first and second delay time memories 43 and 44 according to the contents of the counter block 45. The mode selection signal 307 may be given by software written in a program. Alternatively, the mode selection signal 307 may be provided from a mode memory, which is hardware such as a register shown in FIG. 9.

Figure 6B:
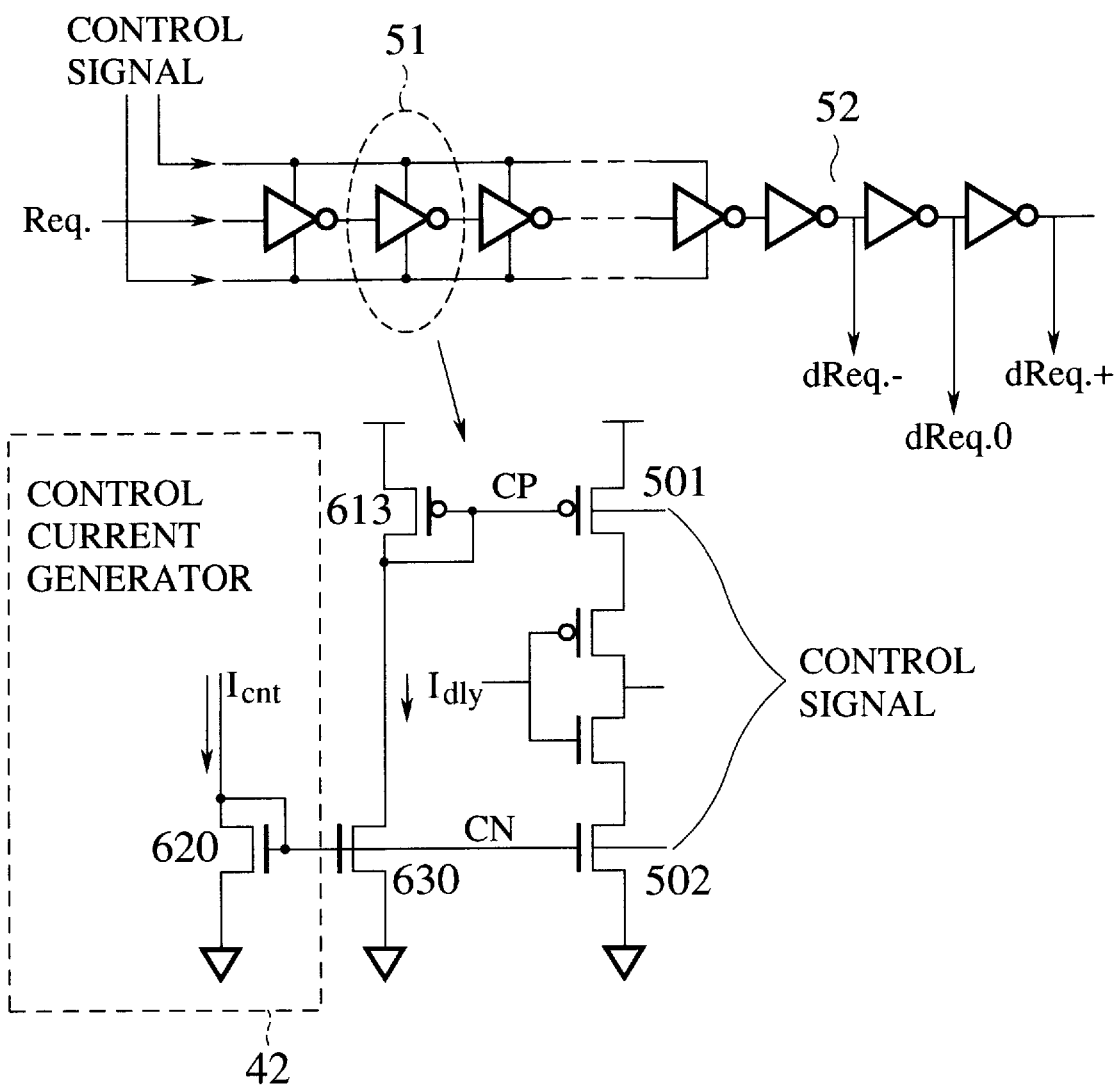
FIG. 6B shows the details of a delay circuit shown in FIG. 6A.

The delay circuit 41 provides a delay time that is controllable according to a control current. FIG. 6B shows the details of the delay circuit 41. The delay circuit 41 has inverters 51 and buffer inverters 52. The inverters 51 are used to control a delay time. The inverters 52 are used to provide fixed delay times. The inverter 51 has a CMOS circuit and constant current sources pMOS 501 and nMOS 502. The pMOS 501 and nMOS 502 are on the source electrode sides of the transistors in the CMOS circuit. The control current generator 42 generates a current $I_{cnt}$, and a current mirror circuit formed by the constant current sources 501 and 502 multiplies the current $I_{cnt}$ by a constant and provides a control current $I_{dly}$.

Figure 6C:
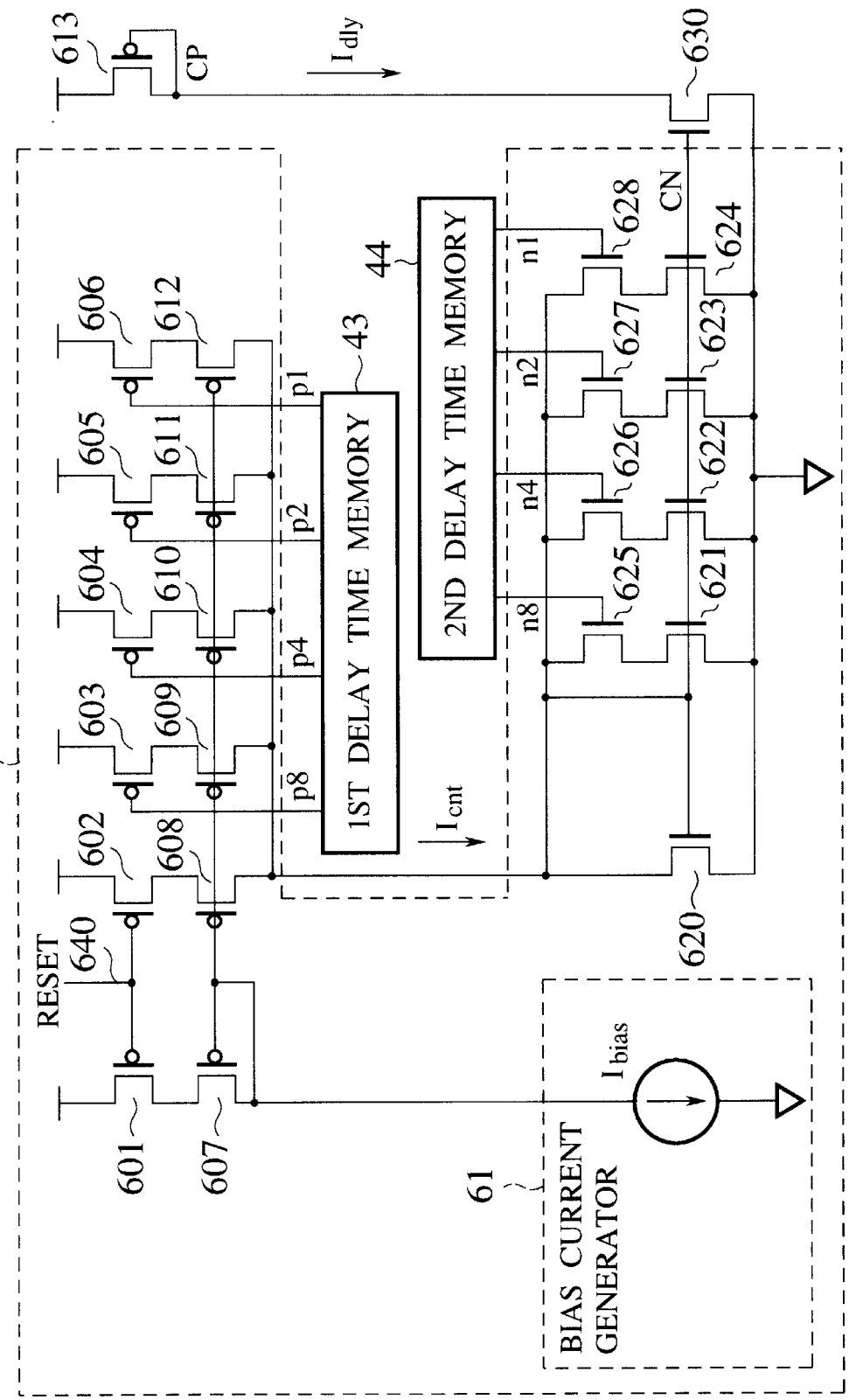
FIG. 6C is a circuit diagram showing the details of a control current generator shown in FIG. 6B.

FIG. 6C shows the details of the control current generator 42 with the first and second delay time memories 43 and 44. The control current generator 42 determines the control current $I_{dly}$ supplied to the delay circuit 41. A bias current generator 61 generates a constant bias current $I_{bias}$, which is multiplied by a constant by a current mirror circuit, to provide the current $I_{cnt}$. The bias current generator 61 must be stable with respect to power supply fluctuations and temperature changes. The bias current generator 61 may typically be a band gap reference circuit whose basic structure is well known, and therefore, is not explained. A method of generating the control current $I_{dly}$ will be explained in detail with reference to FIG. 6C. The PMOS 607, PMOS 608, and nMOS 620 generate the control current from the bias current. The pMOSs 601 and 602 are used to cut a DC path when a reset signal 640 is high ("H"). At the same time, high level signals ("HHHH") are applied to the gates of pMOSs 603, 604, 605, 606 to reset the control current generator 42. The pMOSs 603 to 612, and nMOSs 621 to 628 are used to change a mirror ratio of the current mirror circuit. A mirror ratio from $I_{bias}$ to $I_{cnt}$ is determined by the contents of the first delay time memory 43, and a mirror ratio from $I_{cnt}$ to $I_{dly}$ is determined by the contents of the second delay time memory 44. In FIG. 6C, the first and second delay time memories 43 and 44 are each a 4-bit register. The first delay time memory 43 provides output signals p8, p4, p2, and p1. The PMOS whose gate is connected to one of these output signals that is in low level is turned on. The second delay time memory 44 provides output signals n1, n2, n4, and n8. The nMOS whose gate is connected to one of these output signals that is in high level is turned on. In this way, the contents of the first and second delay time memories 43 and 44 change the current mirror ratio to determine the control current $I_{dly}$.

As explained above, the second embodiment achieves the DTO mode and the SMS mode. The first and second delay time memories 43 and 44 are for each of these modes, respectively. In an initial state, the first delay time memory 43 is "HHHH" and the second delay time memory 44 is "LLLL."

Under the DTO mode, only the contents of the first delay time memory 43 are updated. The ratio of the geometrical sizes (gate widths) of the pMOSs is properly set to provide a wide range of current mirror ratios. The gate width ratio of the pMOSs is, for example, (603, 609):(604, 610):(605, 611):(606, 612)=8:4:2:1.

Under the SMS mode, only the contents of the second delay time memory 44 are updated. The contents of the first delay time memory 43 are also updated if the second delay time memory 44 overflows. The ratio of the sizes (gate widths) of the nMOSs is, for example, (621, 625):(622, 626):(623, 627):(624, 628)=8:4:2:1.

Figure 6D:
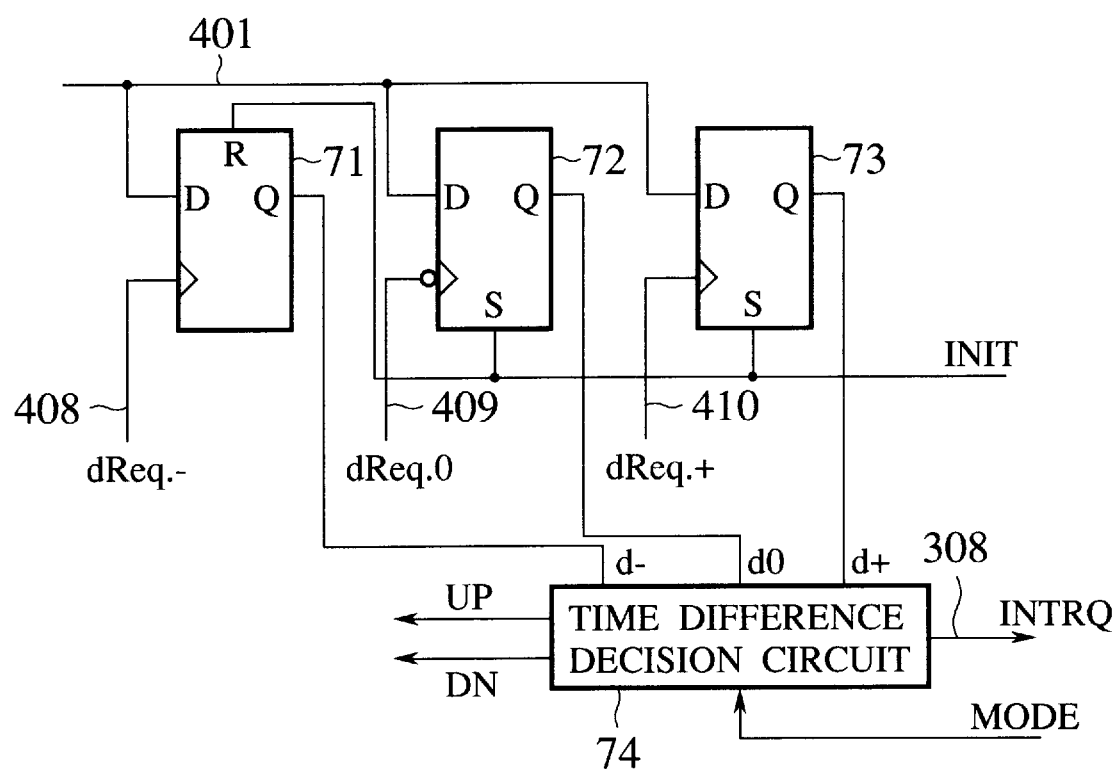
FIG. 6D is a block diagram showing the details of a delay comparator shown in FIG. 6A.
Figure 8:
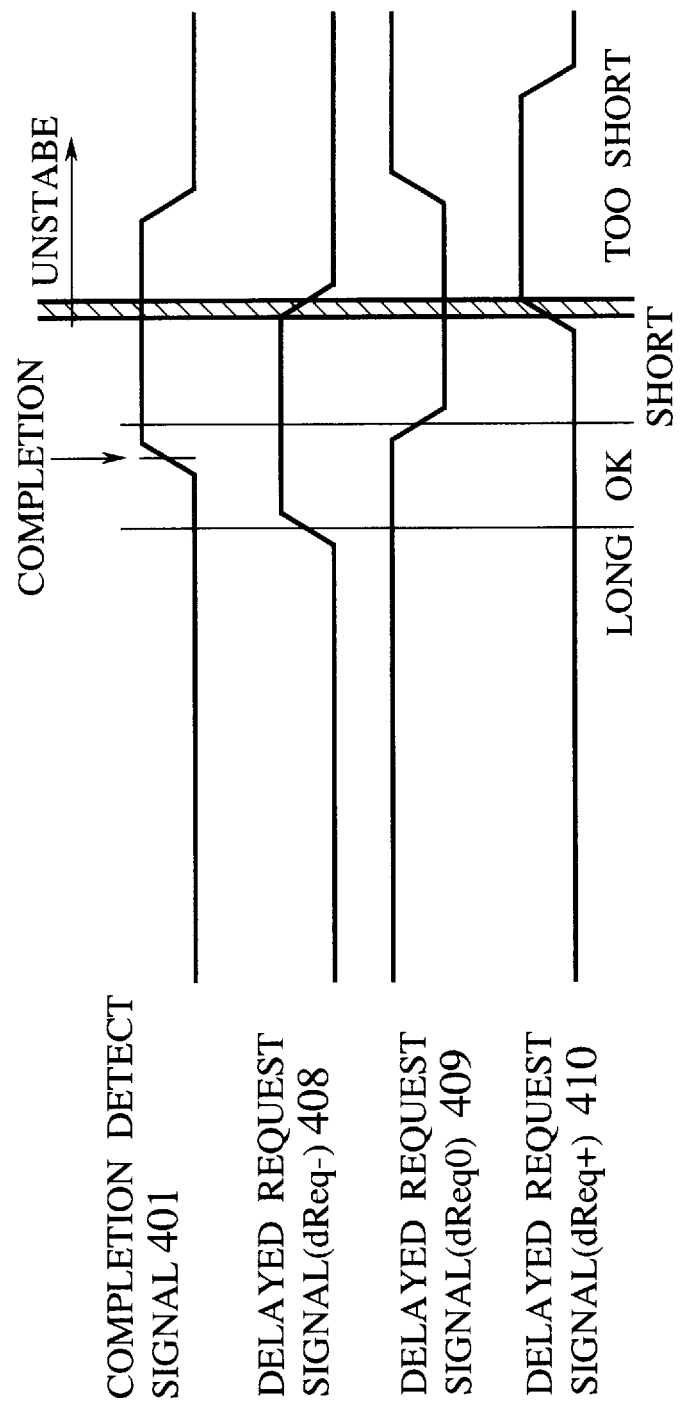
FIG. 8 is a timing chart showing a way of determining a delay time difference according to the second embodiment.

FIG. 6D shows the details of the delay comparator 46 of FIG. 6A. FIG. 7 is a truth table used by a time difference decision circuit 74. FIG. 8 is a timing chart showing an operation of determining the length of a delay time according to signals dReq.− (408), dReq.0 (409), and dReq.+(410) and a completion detect signal 401. The signals 408 to 410 have each a delay time corresponding to the inverter 52. The differences between the completion detect signal 401 and the delayed request signal 408 to 410 are classified into four time regions "long," "OK," "short," and "too short", depending on the time region in which the completion detect signal 408 is present.

This classification or the determination of four time regions is made by flip-flops 71, 72, and 73 of FIG. 6D. The flip-flops 71 and 73 detect each a rising edge, and the flip-flop 72 detects a falling edge. Each delay time among the delayed request signals dReq.−, dReq.0, dReq.+(408, 409, 410) corresponds to one inverter 52. The temporal statuses detected by the flip-flops 71 to 73 are tested by the time difference decision circuit 74. Namely, the time difference decision circuit 74 tests the arrival time of the completion detect signal 401 according to output signals d−, d0, and d+ from the flip-flops 71 to 73. In FIG. 8, the completion detect signal 401 is compared with the delayed request signals dReq.− (408), dReq.0 (409), and dReq.+ (410). If the completion detect signal 401 is provided before dReq.− (408), it is determined that the delay time provided by the delay circuit 41 is "long." If the signal 401 is provided after dReq.− (408) and before dReq.0 (409), it is determined that the delay time is "OK." If the signal 401 is behind dReq.0 (409) and before dReq.+ (410), the delay time is determined as "short." If the signal 401 is behind dReq.+ (410), the delay time is determined as "too short." FIG. 8 shows the case that "OK" is determined by this way.

A way of carrying out the DTO mode and the SMS mode according to a result of the determination will be explained.

FIG. 7 shows a truth table used by the time difference decision circuit 74 when determining the state of the completion detect signal 401. In the DTO mode, a low-level mode signal "L" is supplied to the time difference decision circuit 74. If it is "long," the circuit 74 provides a delay adjusting signal DN of high level "H" to decrement the counter 45 by one. If it is "short" or "too short," the circuit 74 provides a delay adjusting signal UP of high level to increment the counter 45 by one. If it is "OK," the circuit 74 keeps the outputs UP and DN each at low level. In the SMS mode, the mode signal supplied to the time difference decision circuit 74 is high "H". If it is "long" or "OK," the outputs UP and DN of the circuit 74 are each low. If it is "short," the output UP is high to increment the counter 45 by one. If it is "too short," the circuit 74 provides the exception request signal INTRQ 308 of high level because the possibility of destabilizing the system is high. The signal INTRQ 308 resets the first delay time memory 43 to "HHHH" and the second delay time memory 44 to "LLLL." At this time, the delay time provided by the delay circuit 41 is initialized. This delay time will be maximum if the memories 43 and 44 are each at "HHHH." The flip-flops 71 to 73 are initially "LHH," respectively.

A According to the second embodiment, the delay time between adjacent ones of the signals dReq.- (408), dReq.0 (409), and dReq.+ (410) corresponds to a single inverter. The delay time may correspond to two or more inverters. For the case that the delay time corresponds to an even number of inverters, the flip-flop 72 detects the rising edge.

Figure 9:
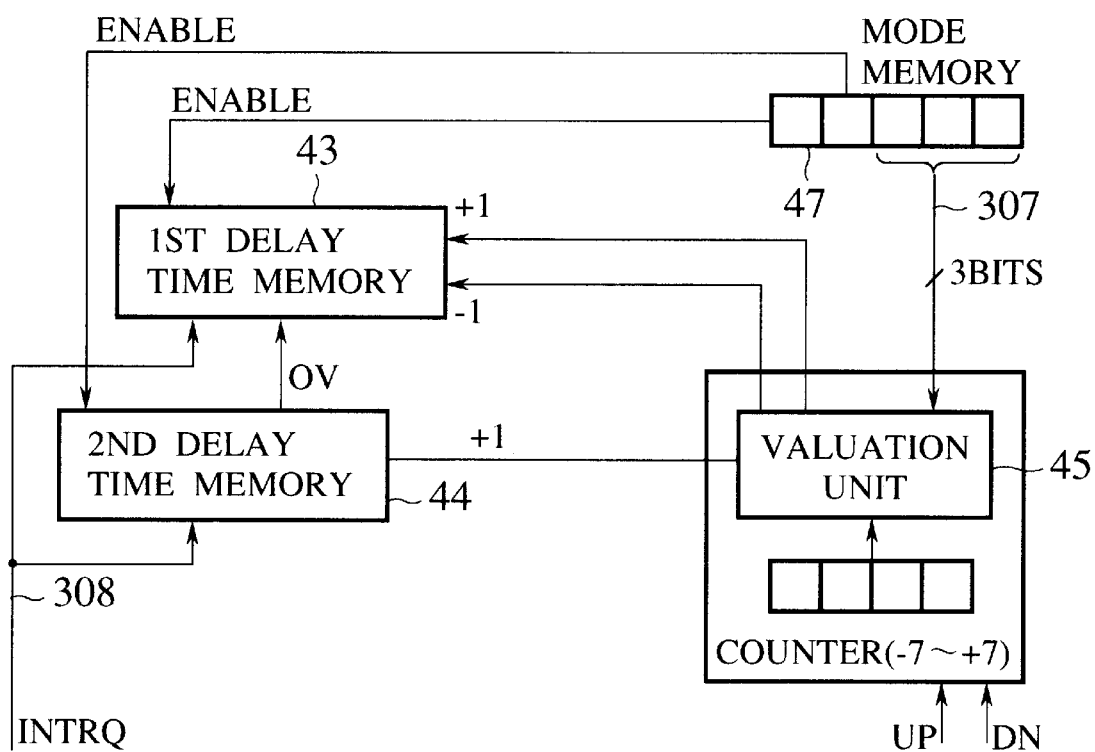
FIG. 9 is a block diagram showing a counter block of FIG. 6A and the periphery thereof.

FIG. 9 shows the details of the counter block 45 of FIG. 6A and the periphery thereof. The mode selection signal 307 of FIG. 6A is made of lower three bits of a 5-bit control signal stored in a mode memory 47. Higher two bits held in the mode memory 47 are used to indicate a delay time memory to be updated. If the most significant bit is high, the first delay time memory 43 is updated, and the DTO mode is carried out. If the second highest bit is high, the second delay time memory 44 is updated, and the SMS mode is carried out. The lower three bits indicate a threshold when setting the delay time memory to +1 or -1. For example, if the lower three bits are "LLH," the memory 43 is incremented by one if the counter 45 indicates +1 and is decremented by one if the counter indicates -1. Namely, whenever the counter 45 is increased or decreased by one, data in the memory 43 is changed. If the lower three bits are "HLL," data in the memory 43 is incremented by one if the counter indicates +4 and decremented by one if the counter indicates -4. The second delay time memory 44 is incremented by one if the lower three bits of the mode memory 47 are "LLH" and the counter 45 indicates +1. If all the bits of the memory 44 are "High" and if the memory 44 must be incremented by one to overflow, the first delay time memory 43 is incremented by one.

FIG. 10 shows the timing of the request signal Req, delayed request signals dReq.-, dReq.0, and dReq.+, and an acknowledge signal Ack in the self-synchronous circuit according to the second embodiment of the present invention.

Returning to FIG. 5, the timing of controlling the delay time provided by the delay circuit block 31 will be explained. A given delay time is added to the request signal (Req) 301 provided by the first status memory 33, and the delayed request signal (dReq) 302 is supplied to the second status memory 35. The DTO mode is carried out if the system is in one of the following two states:

(i) Initialization

The system is initialized when a power supply is turned on. In this case, the evaluation data 305 is stored in the first status memory 33, and the DTO mode is executed. The delay time of the delay circuit 41 in the self-synchronous circuit is determined at this time.

(ii) Cache miss hit

In general, a system may include a CPU, a main memory, and a cache memory. In an interval for transferring data from the main memory to the cache memory, a processing circuit is free from operation. Accordingly, this interval is used to store the evaluation data 305 into the first status memory 33 and carry out the DTO mode.

On the other hand, the SMS mode is carried out when an NOP (non-operation) instruction is executed. A pipeline-type microprocessor frequently adds NOP instructions to branching instructions and data transfer instructions to be carried out on memories including a cache memory. While the NOP instructions are being executed, the processing circuit is not used. During this period, the evaluation data 305 is supplied to the first status memory 33, to monitor the length of the delay time provided by the delay circuit block 31.

Instead of depending on an event such as executing the NOP instruction, it is possible to use, for example, a timer to issue an interrupt to execute the DTO mode at regular intervals.

The evaluation data stored in the evaluation data memory 32 will be explained. In the processing circuit 34, a device that involves a large delay time is an adder or a subtracter. In particular, a large delay time occurs when carries propagate from the least significant bit (LSB) position toward the most significant bit (MSB) position. Input data vectors that provide an operation result of each "0" or each "1" are stored in the evaluation data memory 32. The evaluation data memory 32 is provided with a flag to indicate whether or not a process result is each "0" or "1." When the evaluation data is used, this flag 306 (FIGS. 5 and 6A) is transmitted to the completion detector 40. If a process result is each "0" or "1," the completion detector 40 provides an effective logic result.

As explained above, the operation unit according to the second embodiment of the present invention is asynchronous as a whole. The operation unit carries out the DTO mode according to negative feedback control when an actual operation is not executed. The SMS mode of the second embodiment does not shorten a cycle time for carrying out a normal operation. The delay circuit that provides a delay time corresponding to the processing time of a processing circuit may be an inverter chain. In this case, the delay time may scatter due to manufacturing variations. Even with such variations, the second embodiment is capable of optimizing the delay time. While the operation unit is operating, the second embodiment monitors the delay time, to secure a required minimum delay time and stabilize the operation. The second embodiment carries out the DTO mode and the SMS mode when the processing circuit is free, to secure a minimum delay time. This results in reducing overheads.

Various modifications will become possible for those skilled in the art after receiving the teachings of the present disclosure without departing from the scope thereof.

What is claimed is:

1. An operation unit having a first status memory for holding data, a processing circuit for receiving the data from the first status memory and carrying out a given operation on the data, and a second status memory for holding a result of the operation carried out by the processing unit, the operation unit comprising:

(a) an evaluation data memory for providing the processing circuit with evaluation data through the first status memory, the evaluation data being used to measure a delay time between the input and output of the evaluation data to and from the processing circuit; and (b) a delay circuit block for receiving a result of an operation carried out on the evaluation data from the processing circuit, the evaluation data itself from the evaluation data memory, and a request signal from the first status memory, adding a delay time to the request signal, to generate a delayed request signal, and providing the second status memory with the delayed request signal.

2. The operation unit of claim 1, wherein the evaluation data memory provides the evaluation data when an initialization is carried out at the time of turning on a power supply, or when a cache memory causes a mishit.

3. The operation unit of claims 1, wherein the delay circuit block comprises:

a delay circuit for adding the delay time to the request signal, to generate the delayed request signal, and providing the second status memory with the delayed request signal;

a completion detector for detecting the completion of the operation carried out by the processing circuit on the evaluation data;

a delay time comparator for determining a temporal sequence of a completion detect signal provided by the completion detector and the delayed request signal provided by the delay circuit, and providing a delay adjusting signal; and a delay time controller for changing the delay time of the delay circuit according to the delay adjusting signal.

4. The operation unit of claim 3, wherein the delay time controller carries out negative feedback control on the delay time according to the output of the delay time comparator.

5. The operation unit of claim 3, wherein the delay time controller determines whether or not the delay time must be increased according to the output of the delay time comparator and controls the delay time accordingly.

6. The operation unit of claim 3, wherein the evaluation data is provided when an instruction that does not use the processing circuit is executed.

7. The operation unit of claim 3, wherein the delay time comparator determines a temporal sequence of the completion detect signal and delayed request signal, and if the delay time is shorter than the processing time and if the difference between them is larger than a tolerance, initializes the delay time.

8. The operation unit of claim 3, wherein the delay time controller comprises:

a counter block for incrementing or decrementing a count according to the delay adjusting signal;

first and second delay time memories for storing values provided by the counter block; and a control current generator for generating a control current according to the values stored in the first and second delay time memories.

9. The operation unit of claim 8, wherein the delay time controller changes the delay time according to the control current.

10. The operation unit of claim 8, wherein the control current generator is made of a current mirror circuit having a plurality of transistors, the sizes of the transistors having a given ratio.

11. A method for controlling the processing speed of an operation unit having first and second status memories and a processing circuit sandwiched between the first and second status memories, comprising the steps of:

storing evaluation data in the first status memory, the evaluation data being used to measure a delay time between the input and output of data to and from the processing circuit;

providing the processing circuit with the evaluation data from the first status memory; and adding a delay time to a request signal provided by the first status memory according to a result of an operation carried out by the processing circuit on the evaluation data, to generate a delayed request signal, and sending the delayed request signal to the second status memory.

12. The method of claim 11, including the steps of:

generating a completion signal according to a result of the operation carried out by the processing circuit on the evaluation data when the delayed request signal is sent to the second status memory;

determining a temporal sequence of the completion signal and delayed request signal; and changing the delay time according to the determination.

13. The method of claim 11, including the step of:

storing the evaluation data in the first status memory when an initialization is carried out at the time of turning on a power supply or when a cache memory causes a mishit.

14. The method of claim 11, including the step of:

storing the evaluation data in the first status memory when an instruction that does not use the processing circuit is executed and monitoring the length of the delay time.

* * * * *